United States Patent
Ren et al.

(10) Patent No.: US 10,122,728 B2
(45) Date of Patent: Nov. 6, 2018

(54) DELEGATED RESOURCE AUTHORIZATION FOR REPLICATED APPLICATIONS

(71) Applicant: Verizon Patent and Licensing Inc., Arlington, VA (US)

(72) Inventors: Dahai Ren, Lincoln, MA (US); Hector Saint-Hilaire, Waltham, MA (US); Anil Kadiga, Dublin, OH (US); Shuai Wu, Wellesley, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 211 days.

(21) Appl. No.: 15/046,547

(22) Filed: Feb. 18, 2016

(65) Prior Publication Data

US 2017/0244706 A1    Aug. 24, 2017

(51) Int. Cl.
    *H04L 29/06*    (2006.01)
(52) U.S. Cl.
    CPC ........ *H04L 63/102* (2013.01); *H04L 63/0807* (2013.01); *H04L 63/123* (2013.01)
(58) Field of Classification Search
    CPC ................................ H04L 63/10; H04L 63/08
    See application file for complete search history.

(56) References Cited

U.S. PATENT DOCUMENTS

| | | | |
|---|---|---|---|
| 7,095,855 B1 * | 8/2006 | Collins .................. | H04L 63/08 380/241 |
| 8,479,021 B2 * | 7/2013 | Fielder .................. | G06F 21/78 713/193 |
| 8,539,241 B2 * | 9/2013 | Fielder ................. | G06F 21/6209 713/181 |
| 8,726,032 B2 * | 5/2014 | Fielder .................... | G06F 21/62 713/181 |
| 8,782,408 B2 * | 7/2014 | Fielder ................. | H04L 9/0838 370/338 |
| 8,850,602 B2 * | 9/2014 | Lee ....................... | G06F 21/121 713/189 |
| 8,934,625 B2 * | 1/2015 | Fielder ..................... | H04L 9/12 380/42 |
| 8,959,350 B2 * | 2/2015 | Fielder ................. | H04L 63/123 713/172 |

(Continued)

OTHER PUBLICATIONS https://tools.ietf.org/html/draft-ietf-oauth-v2-23, Hammer et al., Jan. 21, 2012.*

(Continued)

*Primary Examiner* — Yonas A Bayou

(57) ABSTRACT

An authenticating device assigns an application identifier and an application secret value to a customer application, receives a first resource authorization request from a first instance of multiple replicated instances of a customer application, where the first instance is installed in a first machine, and receives a second resource authorization request from a second instance of the multiple replicated instances of the customer application, where the second instance is installed in a second machine. The authenticating device generates, responsive to the first resource authorization request, a first token using a first network address associated with the first machine, the application identifier and the application secret value, and returns, to the first instance of the customer application, the generated first token for use in requesting access to a resource server.

20 Claims, 15 Drawing Sheets

(56) References Cited

U.S. PATENT DOCUMENTS

| | | | | |
|---|---|---|---|---|
| 8,984,133 B2* | 3/2015 | Jung | ................... | H04L 12/585 709/224 |
| 9,374,242 B2* | 6/2016 | Jung | ................... | H04L 51/14 |
| 9,432,269 B2* | 8/2016 | Annamalaisami | ...... | H04L 43/04 |
| 9,693,356 B1* | 6/2017 | Ren | ................... | H04L 67/12 |

OTHER PUBLICATIONS https://tools.ietf.org/html/draft-ietf-oauth-v2-23, Hammer et al., Jan. 21, 2012. (Year: 2012).*

* cited by examiner

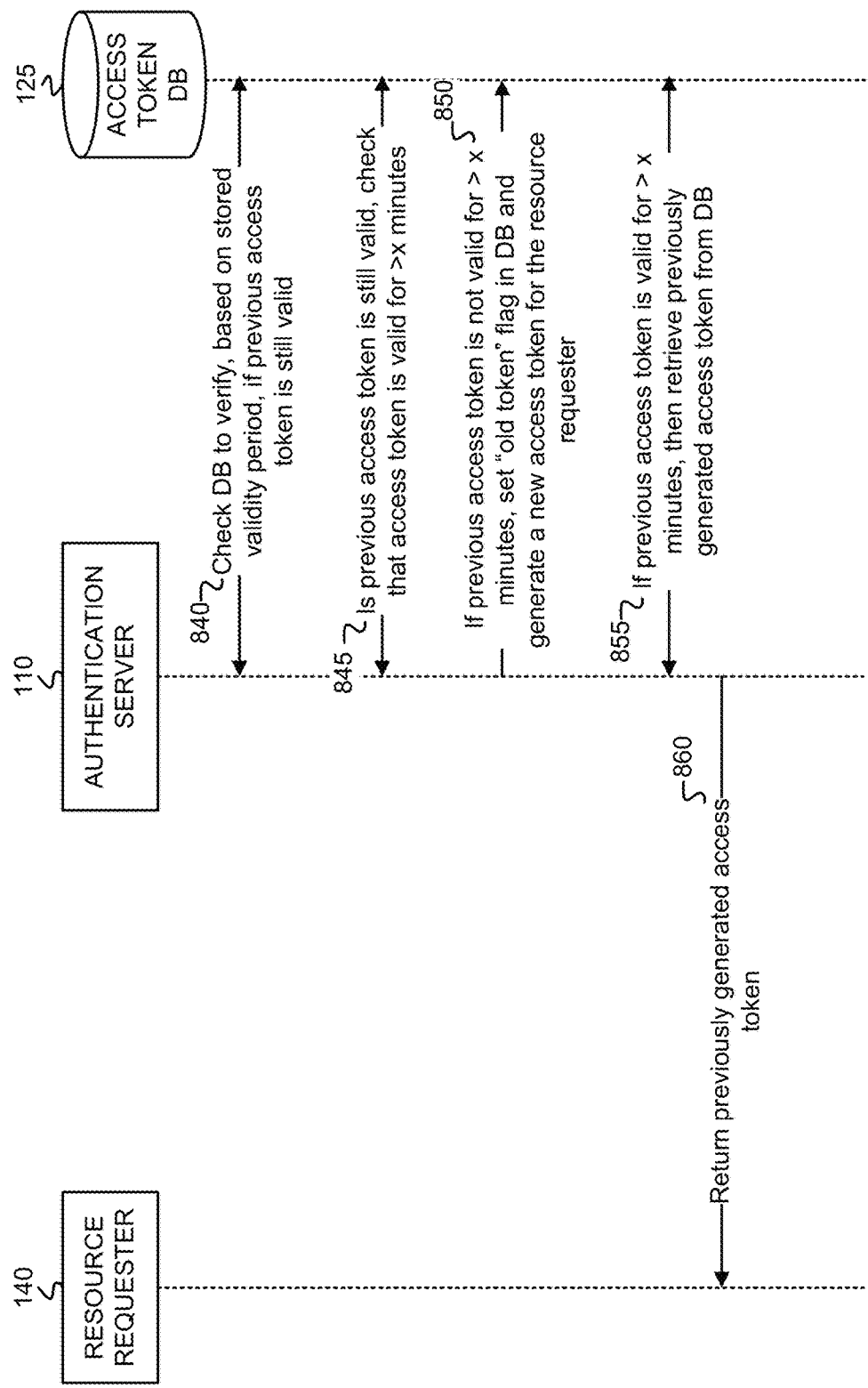

DELEGATED RESOURCE AUTHORIZATION FOR REPLICATED APPLICATIONS

BACKGROUND

OAuth 2.0 is an open standard for authorization that enables applications, within a network environment such, for example, the Internet, to obtain limited access to content offered by third party websites. OAuth 2.0 provides secure delegated access to requesting applications for accessing the server resources of a resource owner. OAuth 2.0 provides this secure delegated access via a specified process that authorizes third party access to the server resources without the resource owner having to share access credentials.

BRIEF DESCRIPTION OF THE DRAWINGS

FIGS. 8A-8C are exemplary messaging diagrams associated with the exemplary process of FIGS. 7A-7C;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein modify the OAuth 2.0 standard to permit secure third party access to an application, multiple instances of which are installed within a group of machines (e.g., a server farm or cluster) owned and/or operated by a single customer. During registration of the application that is replicated across multiple customer machines, the application is assigned a single application identifier and a single application "secret." A secure access service described herein issues different access tokens to permit resource access to the multiple instances of the application, and to validate resource access requests from the multiple instances of the application.

Figure 1:
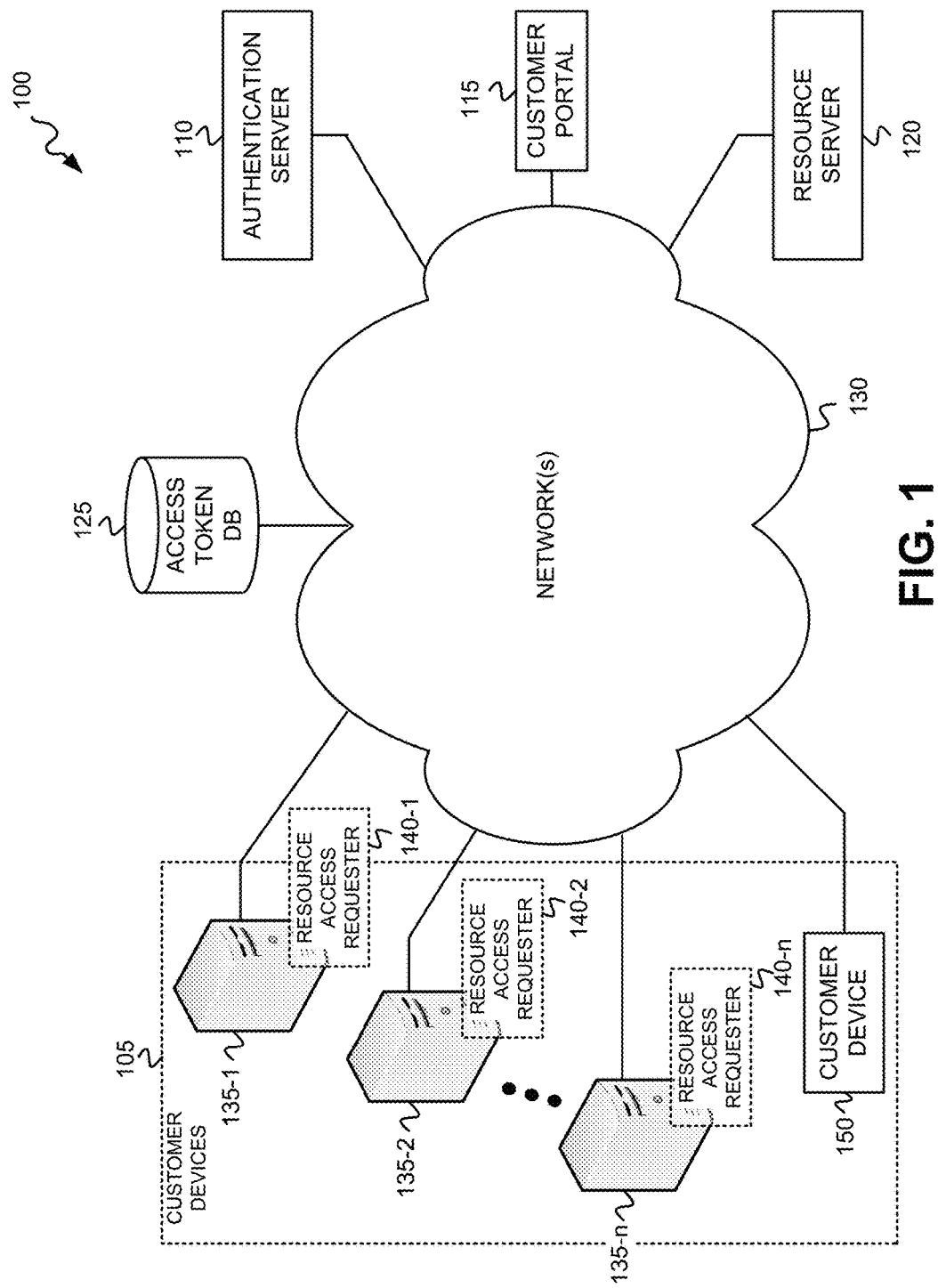
FIG. 1 illustrates an exemplary network environment in which multiple, replicated applications may request access to a resource server.

FIG. 1 illustrates an exemplary network environment 100 in which multiple, replicated customer applications may request access to a resource server. Network environment 100 may include customer devices 105, an authentication server 110, a customer portal 115, a resource server 120, an access token database (DB) 125, and a network 130.

Customer devices 105 may include multiple devices owned, operated and/or maintained by a particular customer. Customer devices 105 may include multiple servers 135-1 through 135-n (where n is a positive integer equal to or greater than 2) and a customer device 150. Servers 135-1 through 135-n (generically referred to herein as "server 135" or "servers 135") may be installed with a respective one of resource access requesters 140-1 through 140-n (generically referred to herein as "resource access requester 140" or "resource access requesters 140"). Servers 135 may each include a network device (also referred to herein as a "machine") that further may include wired and/or wireless connectivity for accessing network(s) 130. In one implementation, servers 135 may each include a web application server or web application machine that serves content (e.g., webpages, audio, and/or video) which is "consumed" by web browsers of client devices (not shown in FIG. 1) or by mobile applications of client devices (not shown). Resource access requesters 140 may include multiple instances of a customer application that each requires access to storage at resource server 120 for purposes of retrieving data stored at resource server 120 or for storing data at resource server 120. The multiple instances of the customer application may include a same customer application replicated (i.e., copied) and installed on multiple machines (i.e., servers 135-1 through 135-n). Customer device 150 may include any type of device, associated with the customer, which performs digital computations and which has wired and/or wireless connectivity for accessing network(s) 130. Customer device 150 may include, for example, a cellular telephone (e.g., a "smart-phone") or a computer (desktop, laptop, palmtop, or tablet computer). The wireless connectivity of customer device 150 may include, for example, Bluetooth™ connectivity, Wi-Fi connectivity, and/or cellular network connectivity.

Customer portal 115 includes a network device that permits a customer to interact with customer portal 115, via customer device 150, to register the customer, and to register applications installed at servers 135, with a delegated resource authorization service.

Authentication server 110 includes a network device that implements the delegated secure access service described herein with respect to FIGS. 7A-7C and FIGS. 9A and 9B.

Resource server 120 may include storage (e.g., memory) for storing data. The secure access service described herein may be used to control access to resource server 120 for the purpose of storing data at resource server 120 and/or retrieving data stored at resource server 120.

Access token DB 125 stores various data, described in further detail below with respect to FIG. 4, associated with access tokens generated by authentication server 110 and provided to resource access requesters 140.

Network 130 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network).

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though a single group of customer devices 105 is shown in FIG. 1, multiple different groups of customer devices 105 may connect to network(s) 130, with each different group of customer devices 105 including servers 135-1 through 135-n and a customer device 150 similar to that shown in FIG. 1.

Figure 2:
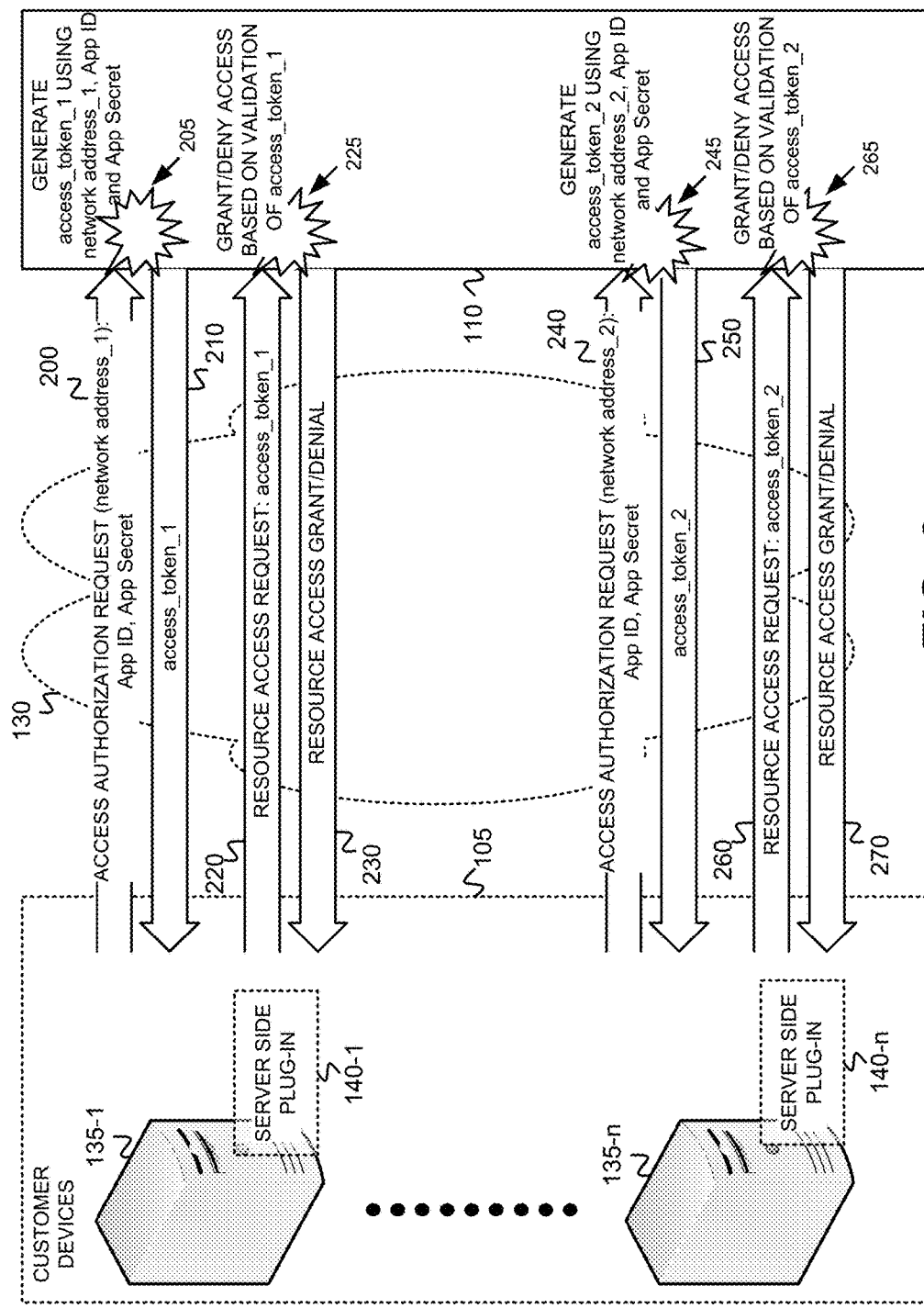
FIG. 2 depicts an exemplary implementation of the network environment of FIG. 1, where each of the multiple, replicated applications includes a server side plug-in application installed at a respective one of multiple different servers.

FIG. 2 depicts an overview of an exemplary implementation of network environment 100 of FIG. 1, where the resource access requesters 140 includes multiple, replicated server side plug-in applications (hereinafter referred to as "server side plug-in 140" or "server side plug-ins 140"), each installed at a respective one of servers 135-1 through 135-n. As shown in FIG. 2, each of the server side plug-ins may obtain access tokens from authentication server 110, and use those access tokens to request access to resource server 120 (not shown in FIG. 2) via authentication server 110. The requested access to resource server 120 may include accessing resource server 120 to store data at resource server 120, or accessing resource server 120 to retrieve data already stored at resource server 120.

As shown in FIG. 2, server side plug-in 140-1 may send an access authorization request 200, which includes a network address (network_address_1) associated with server 135-1, an app ID and an app secret to authentication server 110, where the app ID and the app secret have been previously provided during registration of server side plug-in 140-1. Upon receipt of the access authorization request 200, authentication server 110 generates 205 an access token (access_token_1) using network_address_1, the app ID, and the app secret, and sends a message 210 to server side plug-in 140-1 that includes access_token_1. Authentication server 110 may generate access token_1 by applying, for example, a hash function to network_address_1, the app ID and the app secret.

Subsequently, server side plug-in 140-1 may request access to resource server 120 (not shown in FIG. 2), either to retrieve data from storage at resource server 120 or to store data in storage at resource server 120, by sending a resource access request 220 which includes the previously provided access_token_1. Upon receipt of resource access request 220, authentication server 110 grants or denies 225 the access based on validation of the received access_token_1, as described in further detail below with respect to the exemplary process of FIGS. 9A and 9B. Authentication server 110 returns a message 230 that includes the resource access grant/denial to server side plug-in 140-1 at server 135-1.

As further shown in FIG. 2, server side plug-in 140-n may send an access authorization request 240, which includes a network address (network_address_2) associated with server 135-n, the app ID and the app secret to authentication server 110. Upon receipt of the access authorization request 240, authentication server 110 generates 245 an access token (access_token_2) using network_address_2, the app ID, and the app secret, and sends a message 250 to server side plug-in 140-n that includes access_token_2. Authentication server 110 may generate access token_2 by applying, for example, the same hash function, previously used to generate access_token_1, to network_address_2, the app ID and the app secret.

Subsequently, server side plug-in 140-n may request access to resource server 120 (not shown in FIG. 2), either to retrieve data from storage at resource server 120 or to store data in storage at resource server 120, by sending a resource access request 260 which includes the previously provided access_token_2.

Upon receipt of resource access request 260, authentication server 110 grants or denies 265 the access based on validation of the received access_token_2, as described in further detail below with respect to the exemplary process of FIGS. 9A and 9B. Authentication server 110 returns a message 270 that includes the resource access grant/denial to server side plug-in 140-n at server 135-n.

Figure 3:
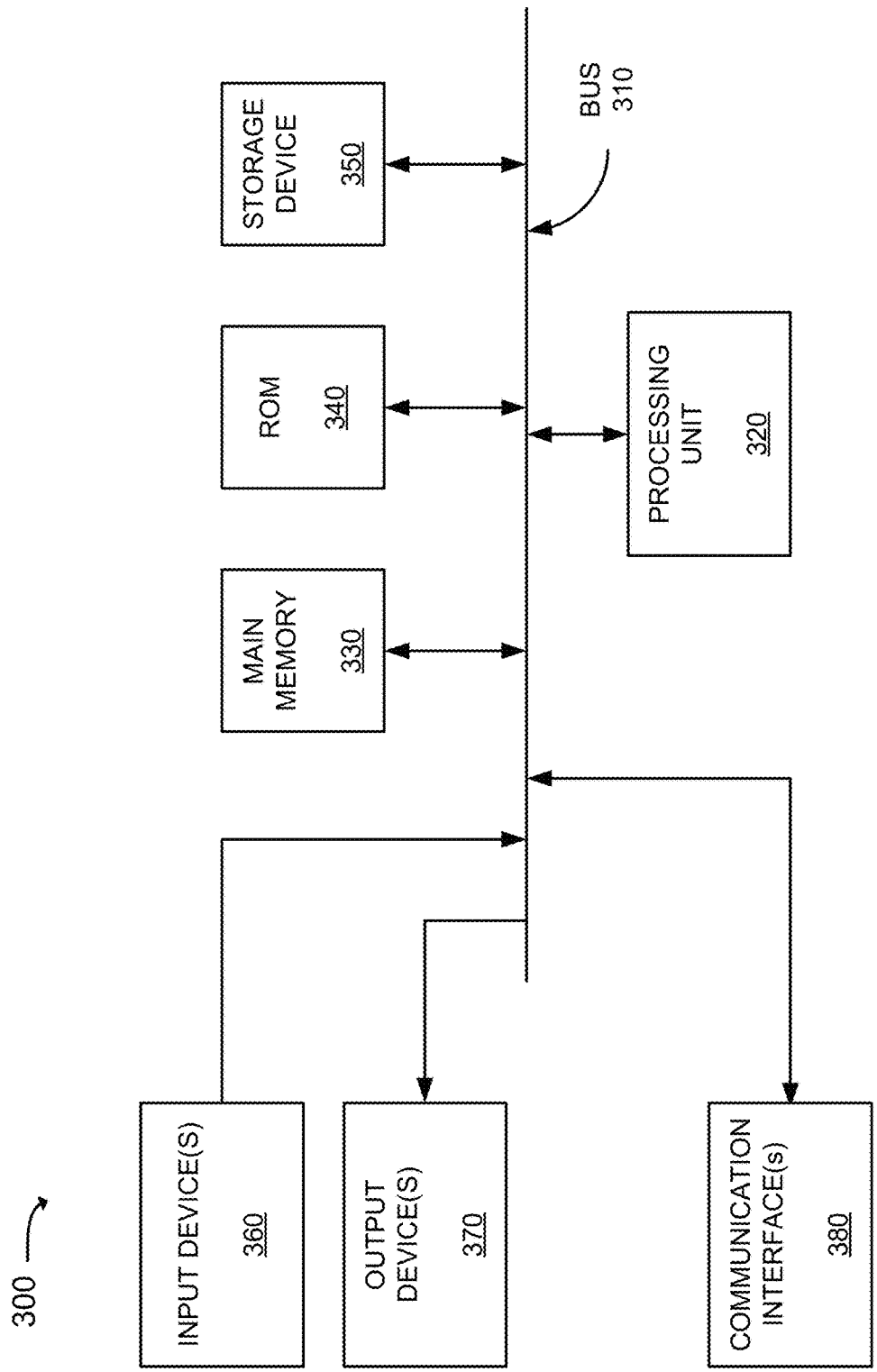
FIG. 3 is a diagram that depicts exemplary components of a device that may correspond to the authentication server, customer portal, resource server, access token database, customer device, and servers of FIG. 1.

FIG. 3 is a diagram that depicts exemplary components of a device 300. Authentication server 110, customer portal 115, resource server 120, access token DB 125, customer device 150, and servers 135 may each be configured similarly to device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 may include a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display, a speaker, etc. Input device 360 and output device 370 may, in some implementations, be implemented as a graphical user interface (GUI) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via network(s) 130.

The configuration of components of device 300 shown in FIG. 3 is for illustrative purposes. Other configurations may be implemented. Therefore, device 300 may include additional, fewer and/or different components, arranged in a different configuration, than depicted in FIG. 3.

Figure 4:
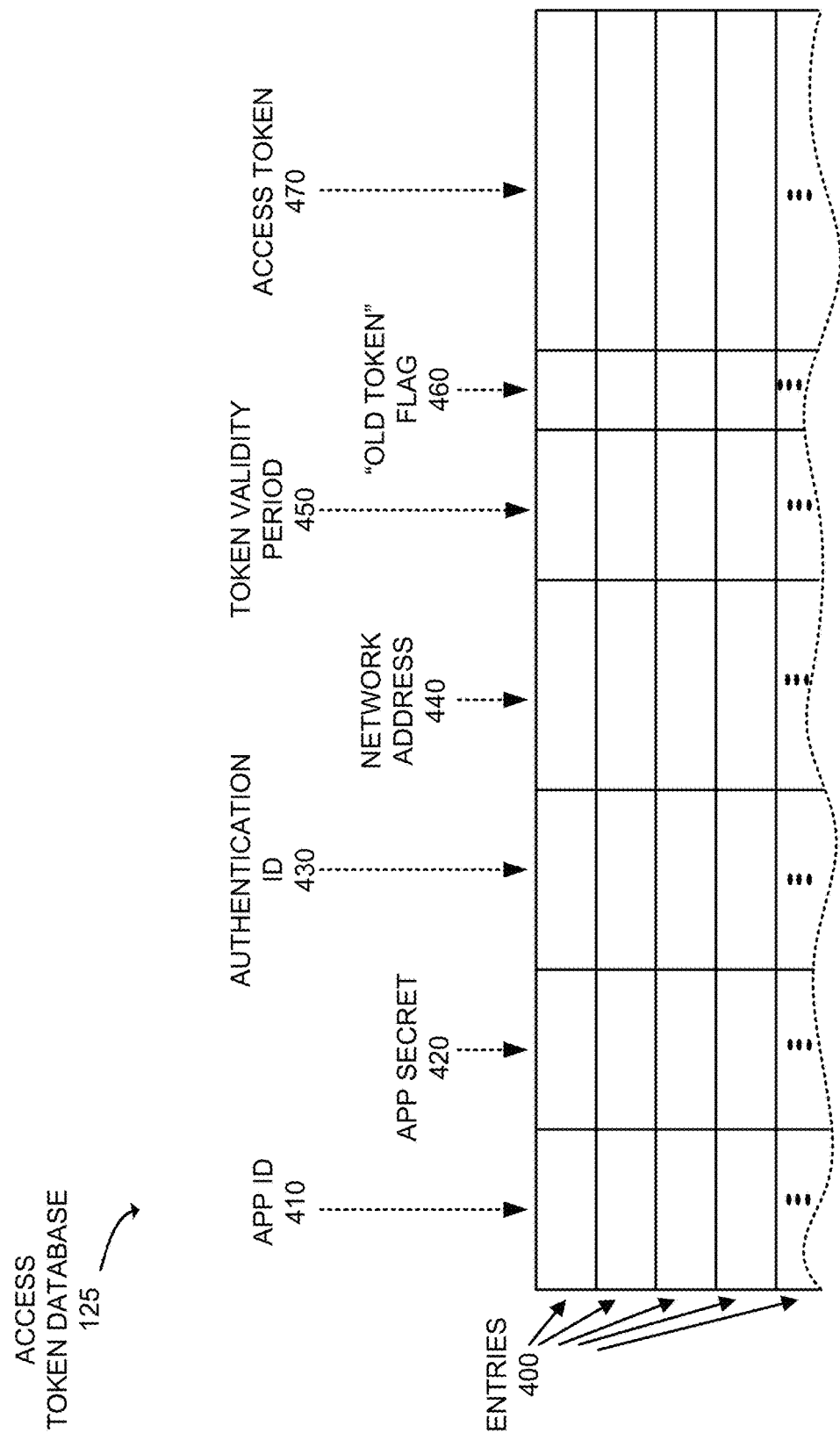
FIG. 4 is a diagram that depicts an exemplary implementation of a data structure of the access token database of FIG. 1.

FIG. 4 is a diagram that depicts an exemplary implementation of a data structure stored in access token database 125. As shown, the data structure of DB 125 may include multiple entries 400, with each entry 400 including an application (app) identifier (ID) field 410, an app secret field 420, an authentication ID field 430, a network address field 440, a token validity period 450, an "old token" flag 460, and an access token field 470. Descriptions of the various fields below, unless stated otherwise, relate to the data of the fields of a same entry 400 of DB 125.

App ID field 410 stores data that includes an identifier that identifies a particular customer application. Each replicated application associated with a same customer, such as the replicated applications represented by resource access requester apps 140-1 through 140-*n* of FIG. 1, may have a same application identifier.

App secret field 420 stores data that represents a block of "secret" data provided to a customer for a particular customer application. The secret data of the app secret may be used as a password for the customer application(s) to request an access token from authentication server 110. Authentication ID field 430 stores data that represents a unique identifier, generated based on an application ID, an application secret, and a network address associated with an authorization request sent from a resource requester 140. In one implementation, the authentication ID may include a unique key generated by an algorithm that produces a same unique key for a same input combination of application ID, application secret, and network address. Various types of algorithms may be used to generate the authentication ID as long as the algorithms produce a same unique key for a same combination of application ID, application secret, and network address. Network address field 440 stores data that identifies a particular machine (e.g., a server 135) at which the application identified in app ID field 410 is installed and executing.

Token validity period 450 stores data that provides an indication of a period of time during which the access token stored in access token field 470 is valid and unexpired. The data stored in token validity period field 450 may include a time of issuance time stamp and a validity duration period. Alternatively, the data stored in token validity period field 450 may include a future time, and/or date and time, at which the access token expires and becomes invalid.

"Old token" flag field 460 stores data that represents a flag which identifies whether the access token stored in field 470 is an older access token, and not a new access token, for the application identified in field 410 and installed at a machine identified by the network address stored in field 440. In one implementation, the flag stored in field 460 may include a single bit of data, with the bit being a high value (e.g., a digital "1") indicating the flag is set, and the bit being a low value (e.g., a digital "0") indicating the flag is cleared. Setting of the flag in field 460 indicates that there is another, newer access token stored in a different entry 400 for a particular customer application identified in field 410 and installed at a machine identified by a network address stored in field 440.

Access token field 470 stores a particular access token generated by authentication server 110 and sent to a particular customer application identified by an app ID stored in app ID field 410 and a network address stored in field 440.

Access token database 125 is depicted in FIG. 4 as including a tabular data structure with a certain number of fields storing certain content. The tabular data structure of DB 125 shown in FIG. 4, however, is for illustrative purposes. Other types of data structures may alternatively be used. The number, types, and content of the entries and/or fields in the data structures of DB 125 illustrated in FIG. 4 are also for illustrative purposes. Other data structures having different numbers of, types of and/or content of, the entries and/or the fields may be implemented. Therefore, access token database 125 may include additional, fewer and/or different entries and/or fields than those depicted in FIG. 4. Data may be retrieved from DB 125 by, for example, indexing one or more of fields 410-470 with particular data to find a match between the particular data and the data stored in the indexed field. When a match is found in an entry 400 of DB 125, data may be retrieved from a particular field of the entry 400.

Figure 5:
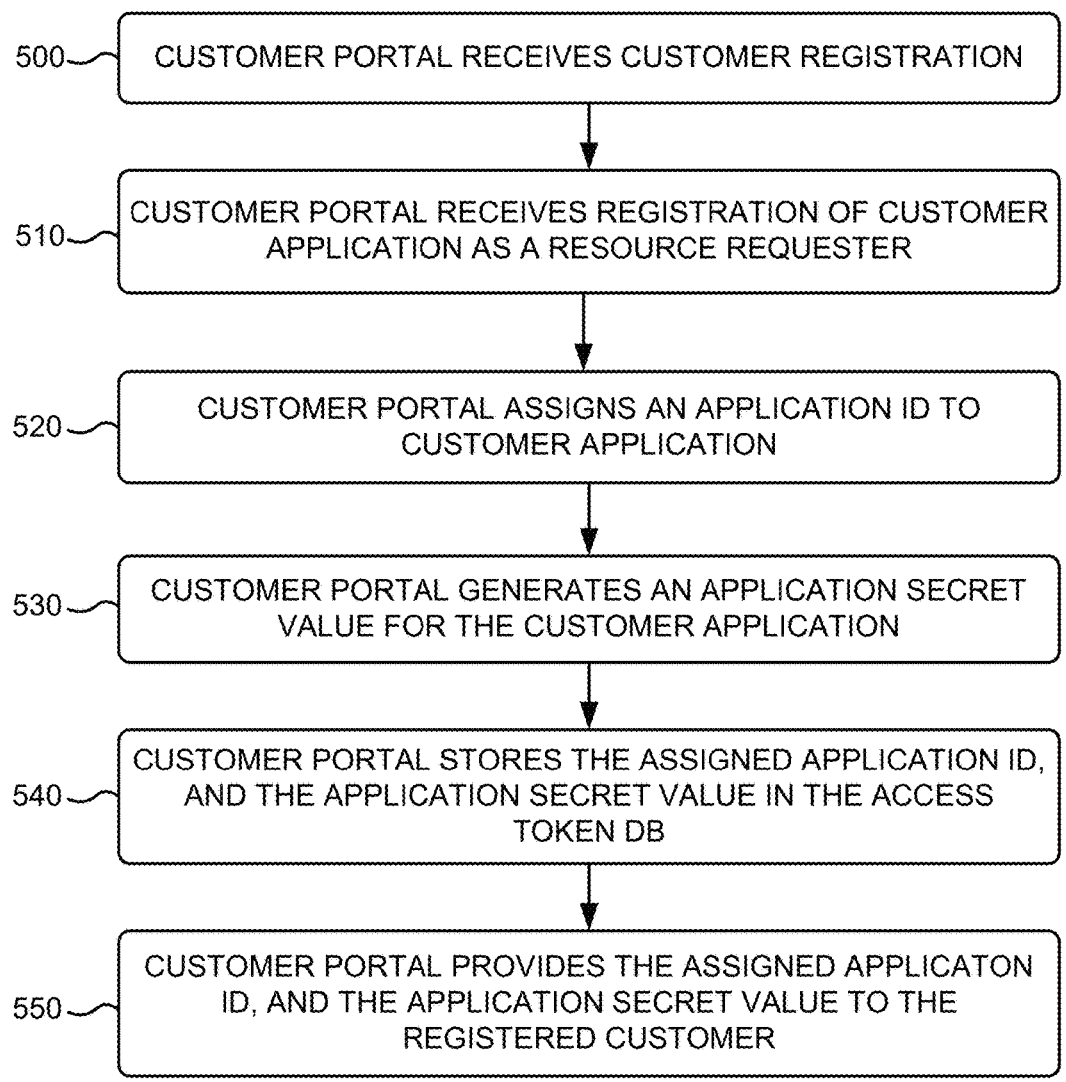
FIG. 5 is a flow diagram that illustrates an exemplary process for registering a customer and a customer application for authenticated access to the resource server of FIG. 1.

FIG. 5 is a flow diagram that illustrates an exemplary process for registering a customer, and a customer application, for authenticated access to resource server 120. The exemplary process of FIG. 5 may be implemented by customer portal 115 in conjunction with a customer device 150. The process of FIG. 5 is described below with reference to the exemplary messaging diagram of FIG. 6.

Figure 6:
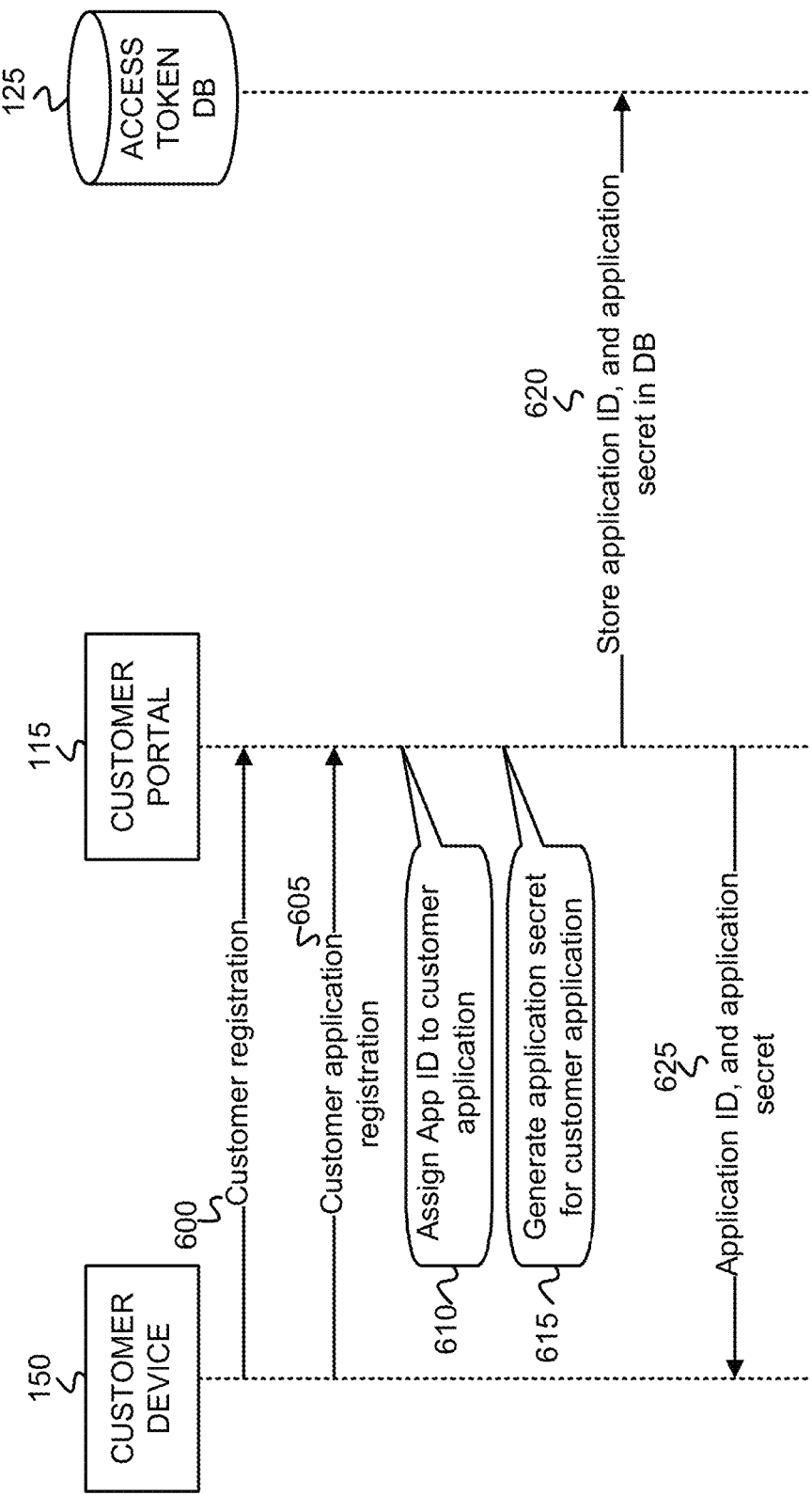
FIG. 6 is an exemplary messaging diagram associated with the exemplary process of FIG. 5.

The exemplary process includes customer portal 115 receiving a customer registration (block 500). The customer registration may include, for example, information that identifies the customer, the customer's physical address, the customer's electronic address (e.g., email address, phone number, etc.), and/or the customer's payment information. As shown in FIG. 6, customer device 150 may send a message 600 that includes a customer registration to customer portal 115.

Customer portal 115 receives a registration of a customer application as a resource requester (block 510). The application registration may identify a particular type of the customer application, such as, for example, a customer application that tracks content consumed by web browsers that is served by a server 135 and maintains timing records associated with the tracked content. Other types of customer applications may, however, be registered. The application registration may further include a network address (e.g., Internet Protocol (IP) address) of the particular machine or machines (e.g., servers 135-1 through 135-*n*) at which the customer application is installed. FIG. 6 depicts customer device 150 sending a message 605 that includes a customer application registration to customer portal 115.

Customer portal 115 assigns an application ID (app ID) to the registered customer application (block 520). For each customer and for each particular customer application, whether the customer application is a single application or multiple, replicated applications installed in multiple machines, customer portal 115 assigns a unique identifier that identifies that application. For example, referring to the example of FIG. 2, customer portal 115 may assign a single application identifier to server side plug-ins 140-1 through 140-*n* of a single customer, where server side plug-ins 140-1 through 140-*n* are each a replicated version of a same plug-in application installed at different machines.

Customer portal 115 generates an application secret (app secret) value for the customer application (block 530). Various different techniques may be used for generating a unique block of "secret" data that may be passed to a customer to use as an authentication password. FIG. 6 depicts customer portal 115 assigning 610 an app ID to a customer application, and generating 615 an application secret value for the customer application.

Customer portal 115 stores the assigned application ID, the application secret value, and the authentication ID in the access token DB 125 (block 540), and provides the assigned application ID, and the application secret value to the registered customer (block 550). FIG. 6 depicts customer portal 115 storing 620 the application ID, and application secret in access token DB 125. Referring to FIG. 4, customer portal 115 may store, in a single entry 400 of DB 125, the application ID in field 410, the application secret in app secret field 420, and the authentication ID in authentication ID field 430. FIG. 6 further depicts customer portal 115 sending a message 625, which includes the application ID and the application secret, to the registered customer at customer device 150. Alternatively, or additionally, customer portal 115 may send the application ID, and the application secret to servers 135-1 through 135-n of the registered customer.

Blocks 510-550 of the exemplary process of FIG. 5 may be repeated for each customer application registered by a particular customer.

Figure 7A:
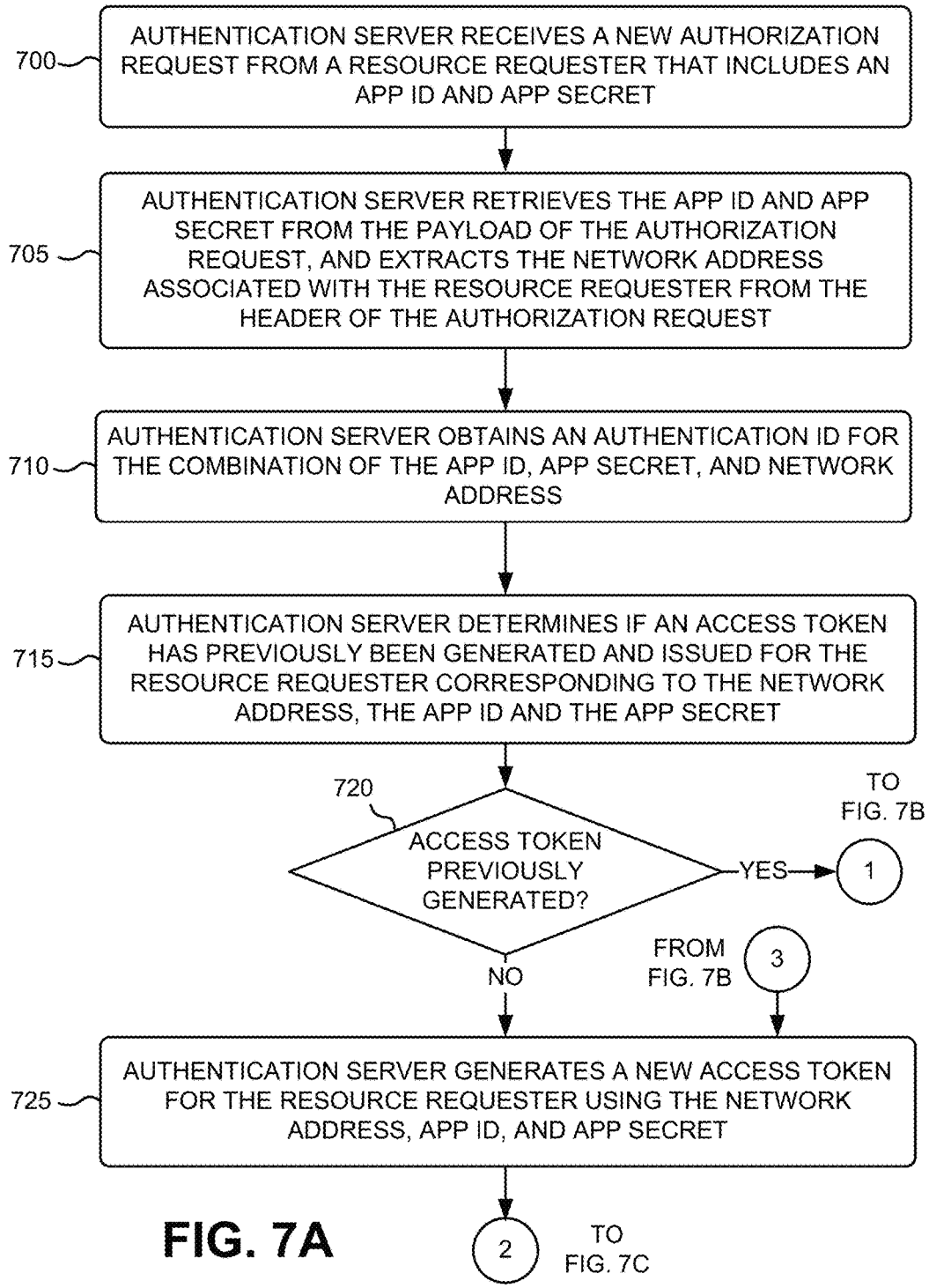
FIGS. 7A-7C are flow diagrams that illustrate an exemplary process for providing access tokens to customer applications based on received authorization requests.
Figure 7B:
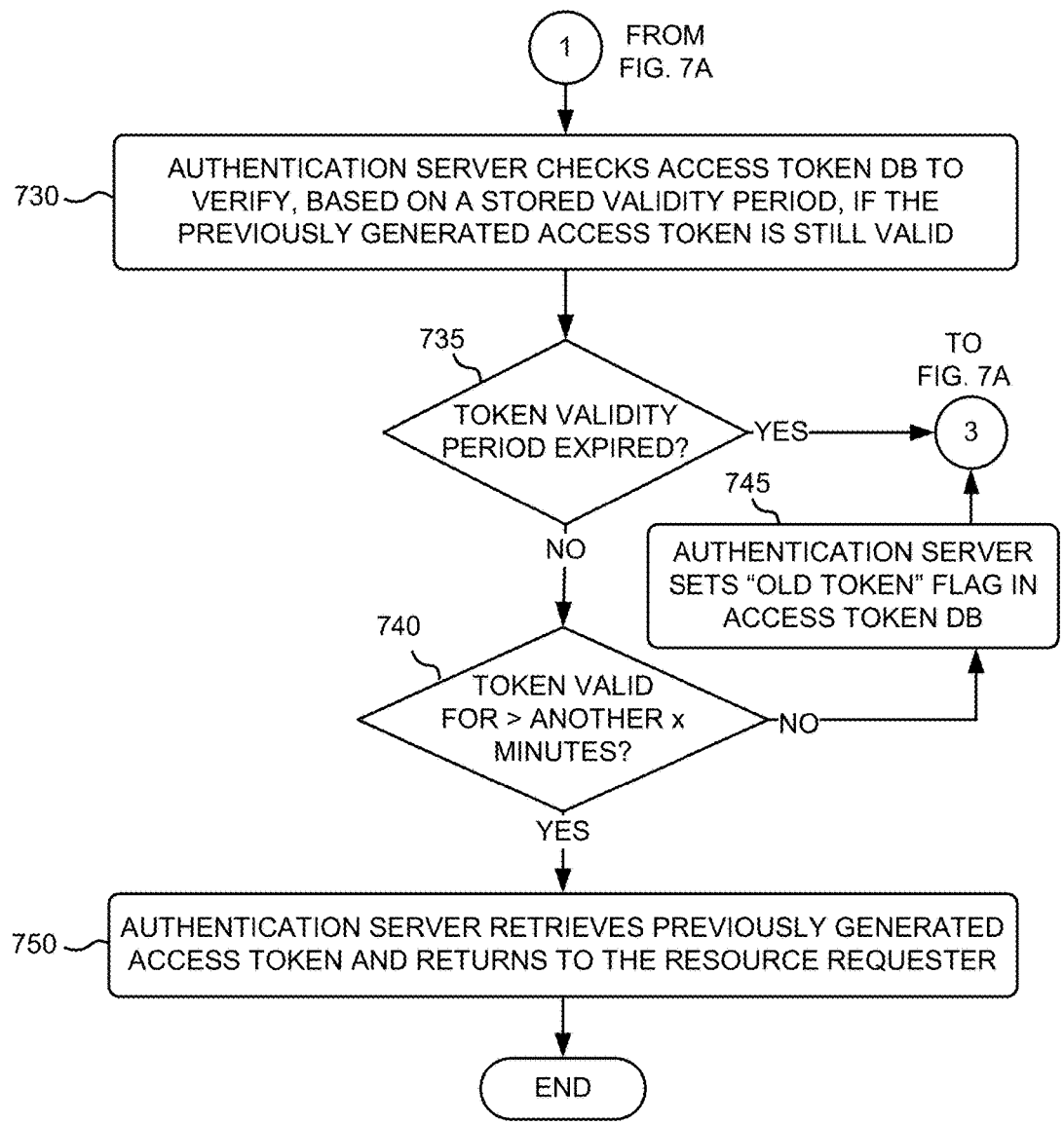
Figure 7C:
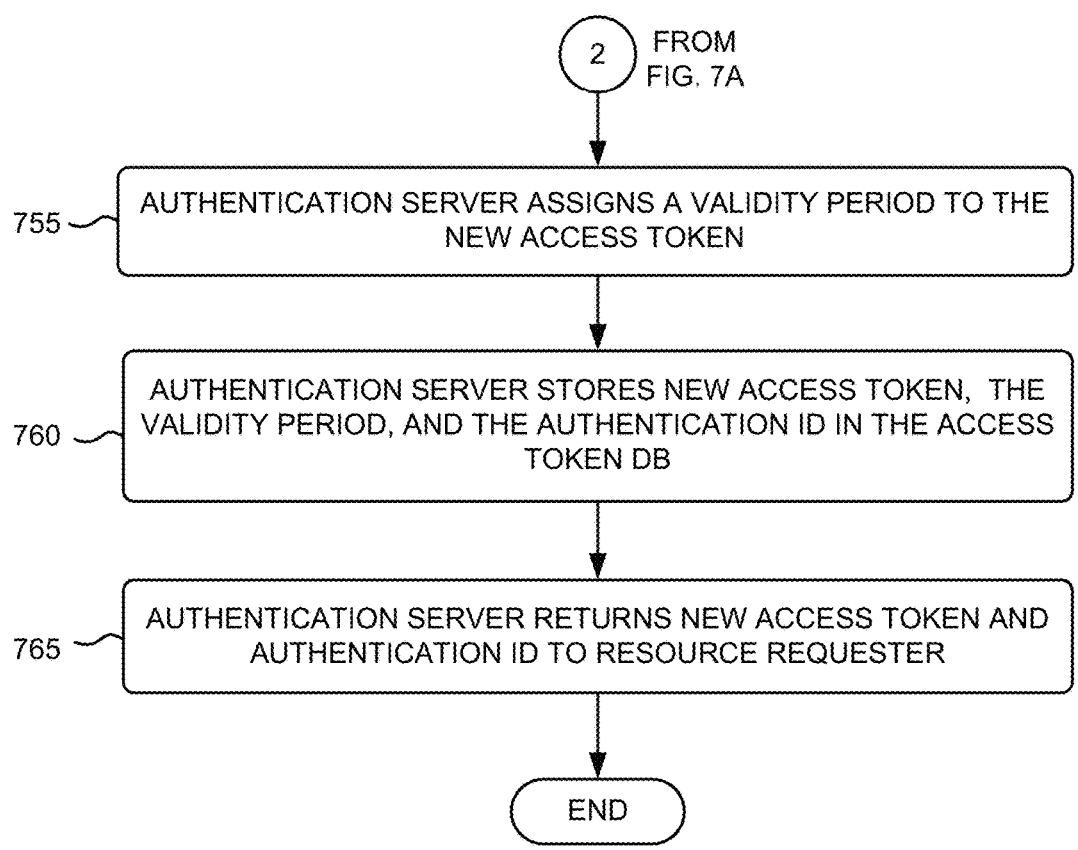

FIGS. 7A-7C are flow diagrams that illustrate an exemplary process for providing access tokens to customer applications based on received authorization requests. The exemplary process of FIGS. 7A-7C may be implemented by authentication server 110. The process of FIGS. 7A-7C is described below with reference to the exemplary messaging diagrams of FIGS. 8A-8C.

Figure 8A:
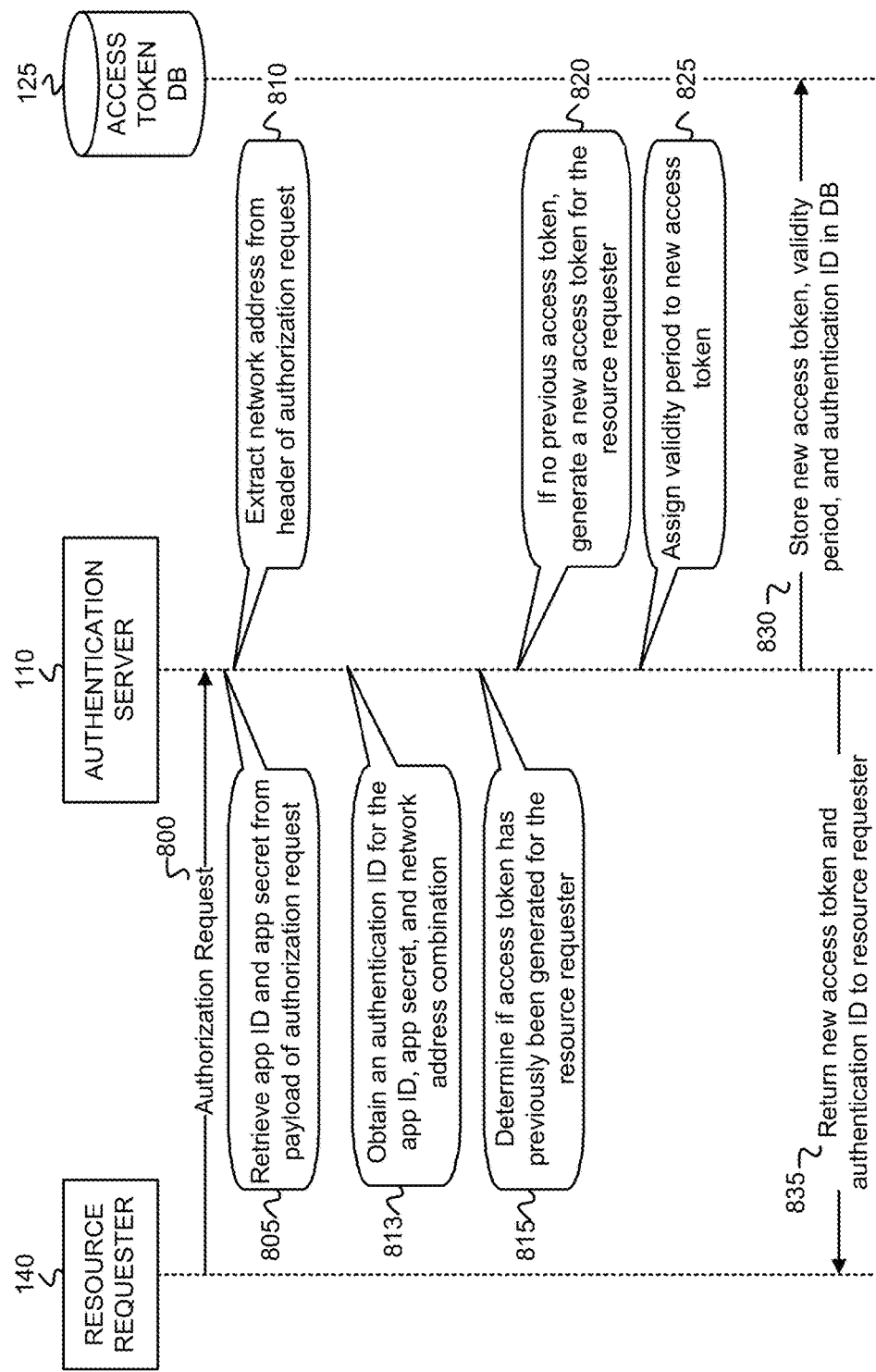

The exemplary process includes authentication server 110 receiving a new authorization request from a resource requester 140 that includes an app ID and an app secret (block 700). The resource requester 140 may include a single instance of a customer application of multiple, replicated customer applications installed at servers 135-1 through 135-n of a particular customer. The app ID and app secret may have been previously provided by customer portal 115 during registration of the customer application. As shown in FIG. 8A, resource requester 140 sends an authorization request message 800 to authentication server 110 requesting a resource access token. Authorization request message 800 may include the application ID and the app secret within the payload of message 800, and a network address associated with the machine (e.g., server 135) in which resource requester 140 is installed within the header of message 800.

Authentication server 110 retrieves the app ID and app secret from the payload of the authorization request, and extracts the network address associated with the resource requester 140 from the header of the authorization request (block 705). Authentication server 110 obtains an authentication ID for the app ID, app secret, and network address combination (block 710). Authentication server 110, in one implementation, may generate the authentication identifier as a unique identifier, generated based on the application ID, the application secret, and the network address associated with the resource requester 140. The authentication ID may include a unique key generated by a deterministic algorithm that produces a same unique key for a same input combination of application ID, application secret, and network address. Various types of algorithms may be used to generate the authentication ID provided that the algorithms produce a same unique key for a same combination of the application ID, application secret, and network address that are input to the algorithms. For example, the algorithm for generating the authentication ID may include a hash function that is applied to the network address, the app ID and the app secret to generate a hash value. FIG. 8A depicts authentication server 110 retrieving 805 an app ID and app secret from the payload of authorization request message 800, and extracting 810 a network address from the header of the authorization request message 800. FIG. 8A further depicts authentication server 110 obtaining 813 an authentication ID for the combination of the app ID, app secret, and resource requester combination. Authentication server 110 determines if an access token has previously been generated and issued for the resource requester 140 corresponding to the network address, the app ID and the app secret (block 715). To determine if an access token has previously been generated and issued for the resource requester 140, authentication server 110 identifies an entry 400 in access token DB 125 in which the contents of the app ID field 410 matches the app ID retrieved from the payload of the authorization request and the contents of the network address field 440 matches the network address extracted from the header of the authorization request. When an entry 400 is identified with the matching content in fields 410 and 440, authentication server 110 retrieves an access token from access token field 470 of the identified entry 400. FIG. 8A further illustrates authentication server 110 determining 815 if an access token has previously been generated for resource requester 140.

If an access token has not been previously generated (NO—block 720), then authentication server 110 generates a new access token for the resource requester 140 using the network address, app ID, and app secret (block 725). If authentication server 110 determines, in block 715, that DB 125 does not contain an entry 400 having contents in the app ID field 410 that matches the app ID retrieved from the payload of the authorization request and contents in the network address field 440 that matches the network address extracted from the header of the authorization request, then authentication server 110 determines that no access token has previously been generated for the resource requester 140. Authentication server 110 generates a new access token for the resource requester 140 using various different token generation techniques. In one implementation, the token generation technique includes applying an algorithm (e.g., a function) to input values that include the network address, the app ID and the app secret and generating an access token that has a different value for each network address, app ID, and app secret combination. Various different types of token generation algorithms may be used for producing an access token based on a given network address, an app ID and an app secret that act as inputs to the algorithms, provided that the algorithms generate a different access token output for each new authorization request, including a different access token output even when a same combination of network address, app ID and app secret is input to the algorithms. For example, the function used to generate the access token may include a hash function that is applied to the network address, the app ID and the app secret to generate a hash value. The hash function used to generate the access token may be a different hash function than that used to generate the authentication ID (i.e., block 710 above). Additionally, to cause a different access token output to be generated for each new authorization request, a random number, or an increasing sequence number (e.g., an increasing sequence number for each specific network address and each new authorization request), may serve as an input to the hash function, in addition to the network address, the app ID and the app secret.

Authentication server 110 assigns a validity period to the generated new access token (FIG. 7C, block 755). Authentication server 110 assigns a validity period that may be a configurable value. For example, the validity period may be configured to be 30 minutes for each newly generated access token. The validity period may be any value, such as, for example, any value between 3-60 minutes. Other validity period values less than 3 minutes, or greater than 30 minutes, may, however, be used.

Authentication server 110 stores the new access token, the validity period, and the authentication ID in access token DB 125 (FIG. 7C, block 760). Authentication server 110 sends the new access token, the validity period, and the authentication ID to access token DB 125 for storage in an entry 400. For example, an entry 400 in DB 125 may be identified for storage, and the new access token may be stored in access token field 470, the assigned validity period may be stored in token validity period field 450, the authentication ID may be stored in authentication ID field 430, the app ID may be stored in app ID field 410, the app secret may be stored in app secret field 420, and the network address may be stored in network address field 440. FIG. 8A depicts authentication server 110 generating 820, if no previous access token was found in DB 125, a new access token for the resource requester 140, and assigning 825 a validity period to the new access token. FIG. 8A further depicts authentication server 110 storing 830 the new access token, the validity period, and the authentication ID in DB 125. Authentication server 110 returns the new access token and the authentication ID to the resource requester 140 (block 765). FIG. 8A depicts authentication server 110 sending a message 835, that includes the generated new access token and the authentication ID, to return the new access token and the authentication ID to the requesting resource requester 140.

Returning to block 720, if an access token has been previously generated and issued for the resource requester 140 corresponding to the network address, the app ID and the app secret (YES—block 720), then authentication server 110 checks access token DB 125 to verify, based on the stored validity period, if the previously generated access token is still valid (FIG. 7B, block 730). If authentication server 110 determines, in block 720, that DB 125 contains an entry 400 having contents in the app ID field 410 that matches the app ID retrieved from the payload of the authorization request and contents in the network address field 440 that matches the network address extracted from the header of the authorization request, then authentication server 110 determines that an access token was previously generated for the resource requester 140. Authentication server 110 further retrieves the validity period from token validity period 450 of the determined entry 400 and determines if the validity period indicates that the access token is either still valid and unexpired, or is expired and invalid (block 735). For example, the retrieved validity period may include a specific future time at which the access token expires, and that specific future time can be compared against the current time to determine if the access token is still valid and unexpired. FIG. 8B depicts authentication server 110 checking 840 access token DB 125 to verify, based on the stored validity period, if a stored, previously generated access token for the resource requester 140 is still valid and unexpired.

If the token validity period for the previously generated access token has not expired (NO—block 735), then authentication server 110 determines if the token validity period for the previously generated access token is still valid for greater than a threshold number of x minutes (block 740). The threshold number x may be a configurable duration of time. For example, if the threshold number x is 15 minutes, the token validity period is 30 minutes, and the current time is 20 minutes into the validity period, then the remaining time on the token validity period is 10 minutes, which is less than the threshold number x of 15 minutes. FIG. 8B depicts authentication server 110 checking 845, if the previous access token is still valid, that the previous access token will continue to be valid for greater than x more minutes.

If the token validity period is not going to continue to be valid for at least the threshold number of x minutes (NO—block 740), then authentication server 110 sets the "old token" flag in access token DB 125 (block 745), and then returns to block 720 of FIG. 7A to generate a new access token for the resource requester 140. Authentication server 110 sets the flag in "old token" flag field 460 of the identified entry 400 that stores the previously generated access token. FIG. 8B depicts authentication server 110 setting 850 the "old token" flag in DB 125 if the previous access token is not valid for at least another x minutes.

If the token validity period is going to continue to be valid for at least the threshold number of x minutes (YES—block 740), then authentication server 110 retrieves the previously generated access token and returns the previous access token to the resource requester 140 (block 750). For example, if the threshold number x is 15 minutes, the token validity period is 30 minutes, and the current time is 10 minutes into the validity period, then the remaining time on the token validity period is 20 minutes, which is greater than the threshold number x of 15 minutes. FIG. 8B depicts authentication server 110 retrieving 855 the stored, previously generated access token from DB 125 if the previous access token is determined to be valid for greater than x minutes, and sending a message 860 to resource requester 140 to return the previously generated access token.

Figure 8C:
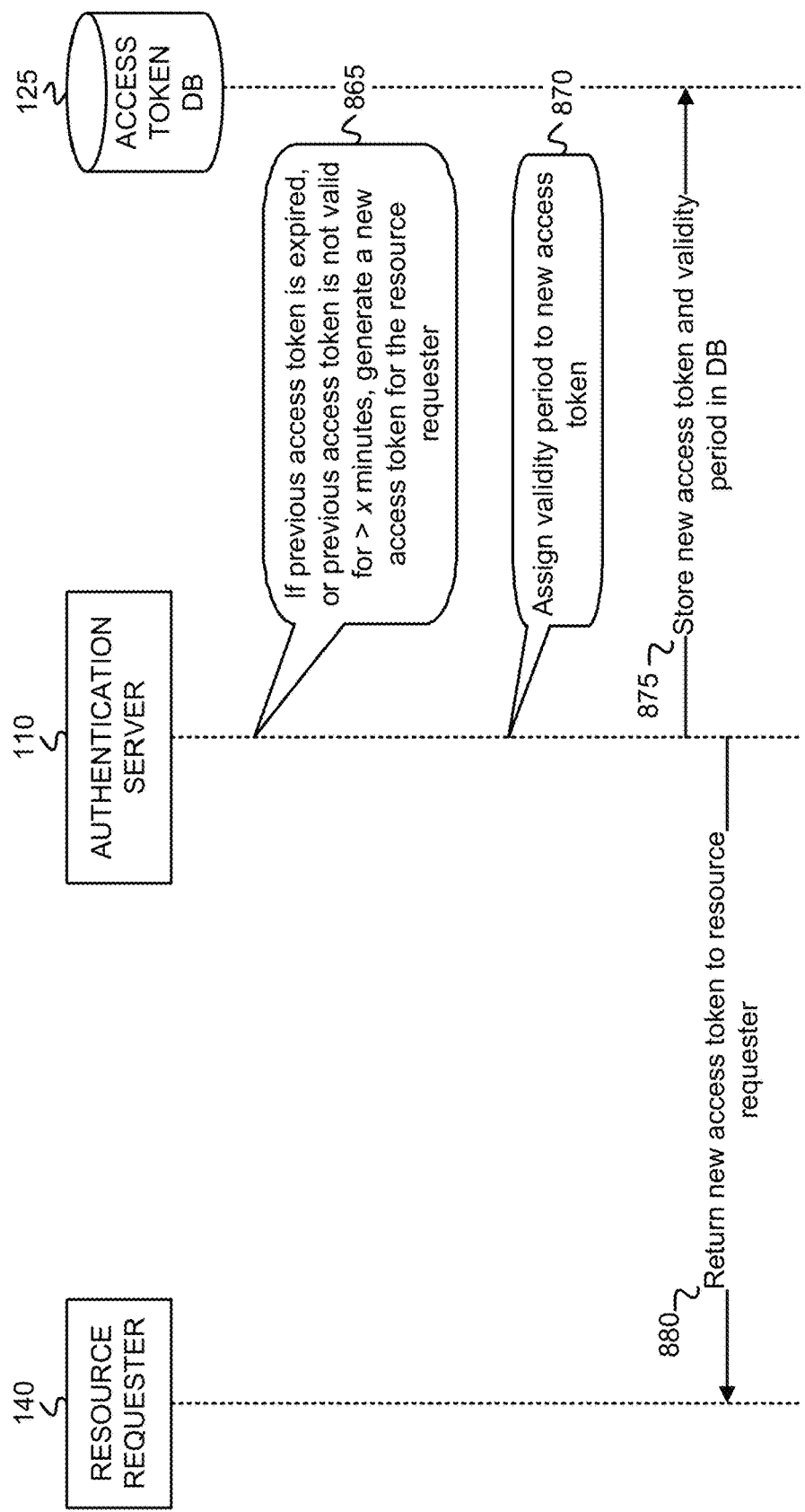

Returning to block 730, if the token validity period for the previously generated access token has expired (YES—block 735), then the exemplary process returns to block 720 of FIG. 7A to generate a new access token for the resource requester 140. FIG. 8C depicts authentication server 110 generating 865 a new access token if the previous access token is determined to be expired, assigning 870 a validity period to the new access token, storing 875 the new access token and the validity period in access token DB 125, and returning 880 the new access token to the resource requester 140.

The exemplary process of FIGS. 7A-7C may be selectively repeated for each new authorization request received at authentication server 110 from a resource requester 140.

Figure 9A:
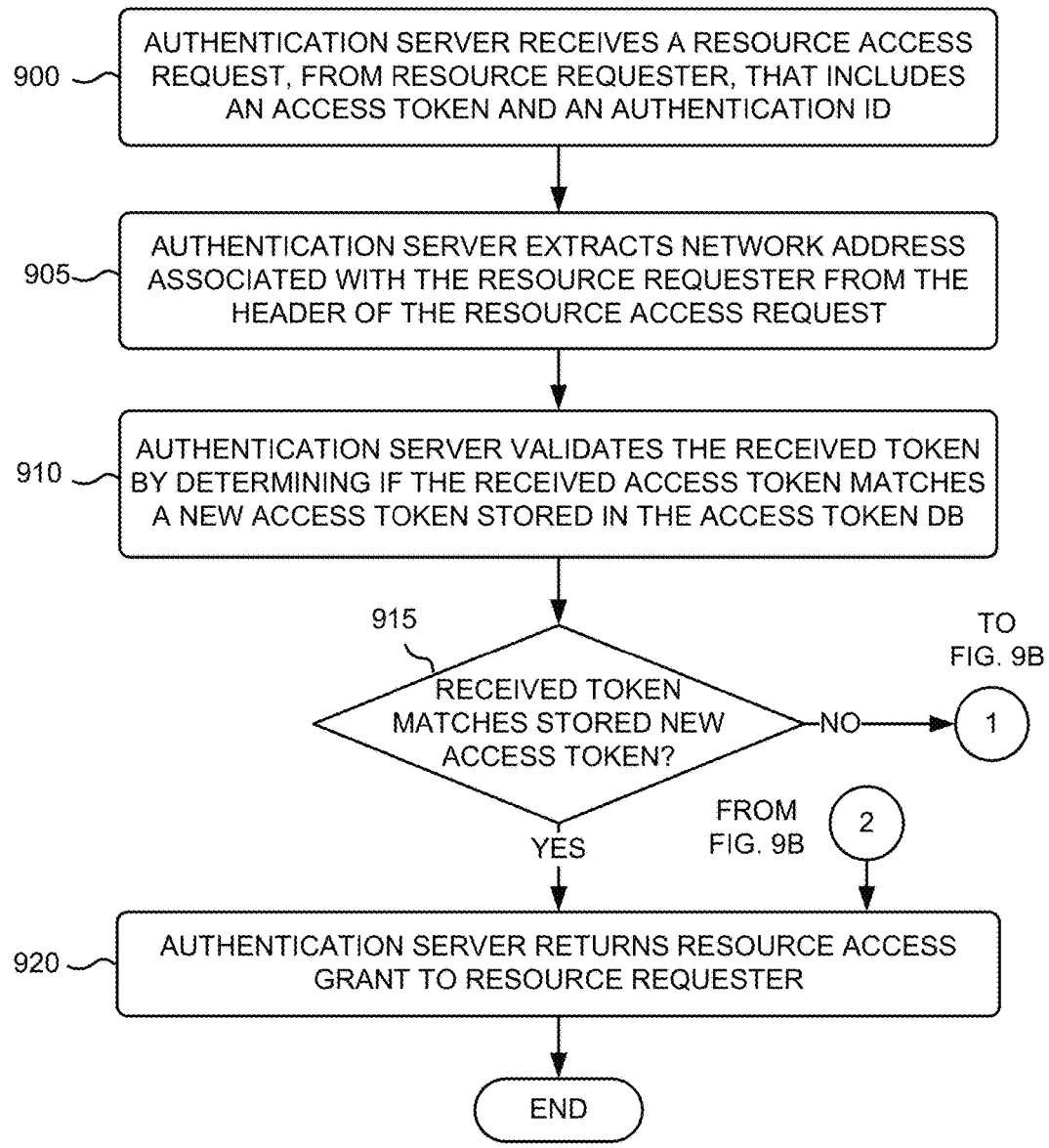
FIGS. 9A and 9B are flow diagrams that illustrate an exemplary process for validating a resource access token associated with a resource access request from a resource requester.
Figure 9B:
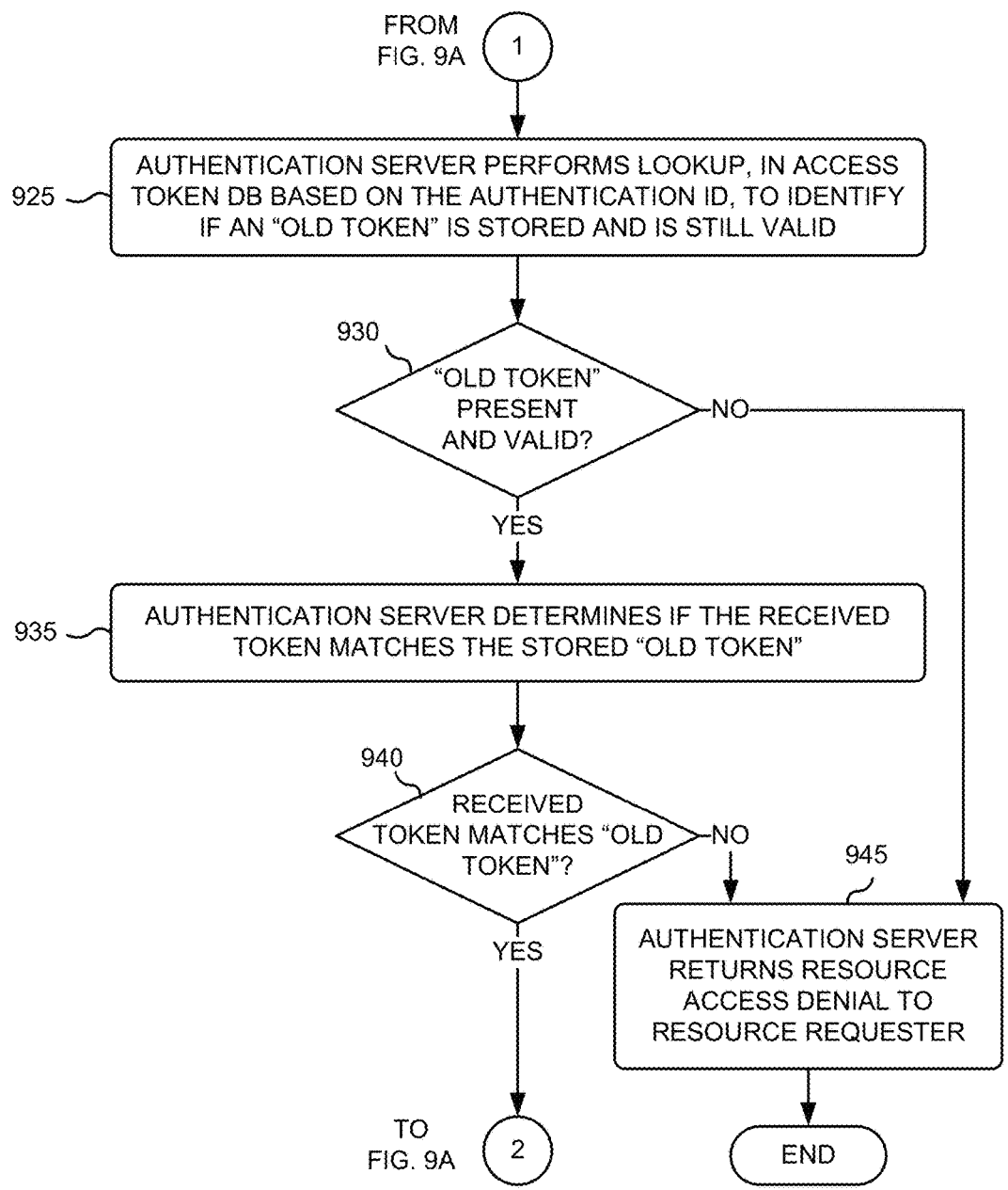

FIGS. 9A and 9B are flow diagrams that illustrate an exemplary process for validating a resource access token associated with a resource access request received from a resource requester 140. The exemplary process of FIGS. 9A and 9B may be implemented by authentication server 110. The process of FIGS. 9A and 9B is described below with reference to the exemplary messaging diagram of FIG. 10.

Figure 10:
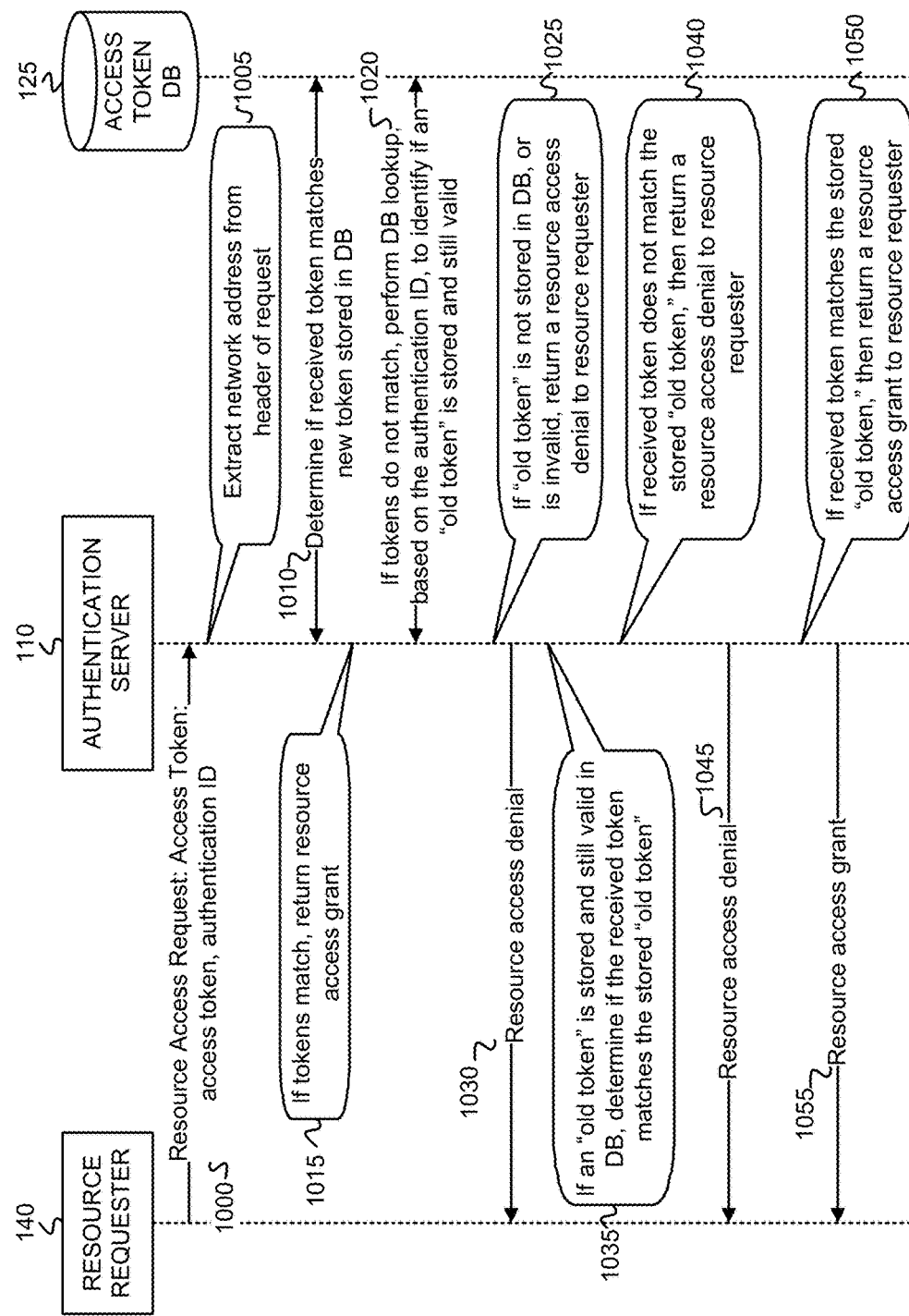
FIG. 10 is an exemplary messaging diagram associated with the exemplary process of FIGS. 9A and 9B.

The exemplary process includes authentication server 110 receiving a resource access request, from a resource requester 140, that includes a resource access token (block 900). FIG. 10 depicts authentication server 110 receiving a resource access request 1000 from resource requester 140. The resource access token included in the resource access request includes the access token previously provided to the resource requester 140 during the process of FIGS. 7A-7C.

Authentication server 110 extracts the network address associated with the resource requester 140 from the header of the resource access request (block 905), and validates the received token by determining if the received access token matches a new access token stored in access token DB 125 (block 910). Authentication server 110 identifies an entry 400 in DB 125 having a content in network address field 440 that matches the network address extracted from the resource access request and in which the "old token" flag in field 460 of the entry 400 is not set. Authentication server 110 then retrieves the access token stored in field 470 from the identified entry 400 of DB 125 and compares the retrieved access token to the access token included with the resource access request. FIG. 10 depicts authentication server 110 extracting 1005 a source network address (e.g., IP address) from the header of the resource access request 1000, and determining 1010 if the received token included in the resource access request 1000 matches a new access token stored in DB 125.

If the received token matches a new access token stored in DB 125 (YES—block 915), then authentication server 110 returns a resource access grant to the resource requester 140 (block 920). If the comparison of the retrieved access token stored in field 470 from the identified entry 400 of DB 125 with the access token included with the resource access request indicates that they match, then, as depicted in FIG. 10, authentication server 110 may return 1015 a resource access grant to resource requester 140.

If the received token does not match any new access token stored in DB 125 (NO—block 915), then authentication server 110 performs a lookup, in access token DB 125 based on the authentication ID, to identify if an "old token" is stored and is still valid (block 925). Authentication server 110 identifies an entry 400 in DB 125 having a content in network address field 440 that matches the network address extracted from the resource access request, having an authentication ID in authentication ID field 430 that matches the received authentication ID, and an entry 400 in which the "old token" flag in field 460 of the entry 400 is set. Authentication server 110 then retrieves the validity period from token validity period field 450 of the identified entry 400 and determines if the validity period indicates that the corresponding access token stored in access token field 470 of the identified entry 400 is still valid and unexpired. FIG. 10 depicts authentication server 110 performing 1020 a lookup in access token DB 125 to identify if an "old token" is stored and still valid.

If an "old token" is either not stored in DB 125, or is stored in DB 125 but is no longer valid (NO—block 930), then authentication server 110 returns a resource access denial to the resource requester 140 (block 945). FIG. 10 depicts authentication server 110 returning 1025 a resource access denial message 1030 to resource requester 140 if an "old token" is not stored in DB 125, or is stored in DB 125 but is invalid.

If an "old token" is stored in DB 125 and is still valid (YES—block 930), then authentication server 110 determines if the received token matches the stored "old token" (block 935)(FIG. 10, 1035). Authentication server 110 retrieves the access token stored in access token field 470 of the identified entry 400 in which the content in network address field 440 matches the network address extracted from the resource access request and in which the "old token" flag in field 460 of the entry 400 is set. Authentication server 110 compares the retrieved access token with the access token included with the resource access request to determine if they match. If the received token does not match the stored "old token" (NO—block 940), then authentication server 110 returns a resource access denial to the resource requester 140 (block 945). FIG. 10 depicts authentication server 110 returning 1040 a resource access denial message 1045 to resource requester 140 if the received token does not match the stored "old token." If the received token matches the stored "old token" (YES—block 940), then the exemplary process returns to block 920, with authentication server 110 returning a resource access grant to the resource requester 140 (block 920). FIG. 10 depicts authentication server 110 returning 1050 a resource access grant message 1055 to resource requester 140 if the received token matches the stored "old token."

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7A-7C, and 9A-9B, and message flows with respect to FIGS. 6, 8A-8C, and 10, the order of the blocks and/or message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
assigning a single application identifier (ID) and a single application secret value (SV) to a customer application, wherein multiple replicated instances of the customer application include a first instance of the customer application assigned the single application ID and the single application SV and installed in a first machine of a machine cluster of customer premises equipment (CPE), and a second instance of the customer application assigned the single application ID and the single application SV and installed in a second machine of the machine cluster of the CPE;
receiving, at an authenticating device, a first resource authorization request from the first instance of the customer application via a wireless network connection to the first machine;
receiving, at the authenticating device, a second resource authorization request from the second instance of the customer application via a wireline network connection to the second machine;
generating, responsive to the first resource authorization request, a first token using a first network address associated with the first machine, the single application ID and the single application SV;
returning, from the authenticating device to the first instance of the customer application, the generated first token for use in requesting access to a resource server;
generating, responsive to the second resource authorization request, a second token using a second network address associated with the second machine, the single application ID and the single application SV; and
returning, from the authenticating device to the second instance of the customer application, the generated second token for use in requesting access to the resource server.

2. The method of claim 1, further comprising:
granting access, to the resource server, to the first instance or the second instance of the customer application based on receipt of the first token or the second token.

3. The method of claim 1, wherein generating the first token using the first network address associated with the first machine, the single application ID and the single application SV comprises:
applying a function to the first network address, the single application ID and the single application SV to generate the first token.

4. The method of claim 3, wherein generating the second token using the second network address associated with the second machine, the single application ID and the single application SV comprises:
applying the function to the second network address, the single application ID and the single application SV to generate the second token.

5. The method of claim 4, wherein the function comprises a hash function and wherein the first token comprises a first hash value and the second token comprises a second hash value.

6. The method of claim 1, further comprising:
storing, by the authenticating device, the first token in a database;
receiving a first resource access request, by the authenticating device, from the first instance of the customer application installed in the first machine, wherein the first resource access request includes a first resource access token; and
validating the first resource access token by comparing the first resource access token to the first token previously stored in the database.

7. The method of claim 6, further comprising:
granting access, to the resource server, to the first instance of the customer application based on the comparison of the first resource access token to the first token previously stored in the database.

8. The method of claim 6, further comprising:
storing, by the authenticating device, the second token in the database;
receiving a second resource access request, by the authenticating device, from the second instance of the customer application installed in the second machine, wherein the second resource access request includes a second resource access token; and
validating the second resource access token by comparing the second resource access token to the second token stored in the database.

9. The method of claim 8, further comprising:
granting access, to the resource server, to the second instance of the customer application based on the validating of the second resource access token.

10. A network device, comprising:
a processing unit configured to:
assign a single application identifier (ID) and a single application secret value (SV) to a customer application, wherein multiple replicated instances of the customer application include a first instance of the customer application assigned the single application ID and the single application SV and installed in a first machine of a machine cluster of customer premises equipment (CPE), and a second instance of the customer application assigned the single application ID and the single application SV and installed in a second machine of the machine cluster of the CPE; and a communication interface connected to a network and configured to:
receive a first resource authorization request from the first instance of the customer application via a wireline network connection to the first machine, and
receive a second resource authorization request from the second instance of the customer application via a wireless network connection to the second machine;
wherein the processing unit is further configured to:
generate, responsive to the first resource authorization request, a first token using a first network address associated with the first machine, the single application ID and the single application SV,
return, via the communication interface to the first instance of the customer application, the generated first token for use in requesting access to a resource server,
generate, responsive to the second resource authorization request, a second token using a second network address associated with the second machine, the single application ID and the single application SV, and
return, via the communication interface to the second instance of the customer application, the generated second token for use in requesting access to the resource server.

11. The network device of claim 10, wherein the processing unit is further configured to:
grant access, to the resource server, to the first instance or the second instance of the customer application based on receipt of the first token or the second token.

12. The network device of claim 10, wherein, when generating the first token using the first network address associated with the first machine, the single application ID and the single application SV, the processing unit is further configured to:
apply a function to the first network address, the single application ID and the application SV to generate the first token.

13. The network device of claim 12, wherein, when generating the second token using the second network address associated with the second machine, the single application ID and the single application SV the processing unit is further configured to:
apply the function to the second network address, the single application ID and the single application SV to generate the second token.

14. The network device of claim 13, wherein the function comprises a hash function and wherein the first token comprises a first hash value and the second token comprises a second hash value.

15. The network device of claim 10, wherein the processing unit is further configured to:
store the first token in a database,
receive, via the communication interface, a first resource access request, from the first instance of the customer application installed in the first machine, wherein the first resource access request includes a first resource access token, and
validate the first resource access token by comparing the first resource access token to the first token stored in the database.

16. The network device of claim 15, wherein the processing unit is further configured to:
grant access, to the resource server, to the first instance of the customer application based on the validating of the first resource access token.

17. The network device of claim 15, wherein the processing unit is further configured to:
store the second token in the database;
receive a second resource access request from the second instance of the customer application installed in the second machine, wherein the second resource access request includes a second resource access token, and
validate the second resource access token by comparing the second resource access token to the second token stored in the database.

18. The network device of claim 17, wherein the processing unit is further configured to:
grant access, to the resource server, to the second instance of the customer application based on the validating of the second resource access token.

19. A non-transitory storage medium storing instructions executable by a computational device, wherein the instructions comprise instructions to cause the computational device to:
assign a single application identifier (ID) and a single application secret value (SV) to a customer application, wherein multiple replicated instances of the customer application include a first instance of the customer application assigned the single application ID and the single application SV and installed in a first machine of a machine cluster of customer premises equipment (CPE), and a second instance of the customer application assigned the single application ID and the single application SV and installed in a second machine of the machine cluster of the CPE;
receive a first resource authorization request from the first instance of the customer application via a wireless or a wireline network connection to the first machine;
receive a second resource authorization request from the second instance of the customer application via a wireless or a wireline network connection to the second machine;
generate, responsive to the first resource authorization request, a first token using a first network address associated with the first machine, the single application ID and the single application SV;
return, to the first instance of the customer application, the generated first token for use in requesting access to a resource server;
generate, responsive to the second resource authorization request, a second token using a second network address associated with the second machine, the single application ID and the single application SV; and
return, to the second instance of the customer application, the generated second token for use in requesting access to the resource server.

20. The non-transitory storage medium of claim 19, wherein the instructions comprise instructions to cause the computational device to:
store the first token in a database;
receive a first resource access request from the first instance of the customer application installed in the first machine, wherein the first resource access request includes a first resource access token;
validate the first resource access token by comparing the first resource access token to the first token stored in the database; and
grant access, to the resource server, to the first instance of the customer application based on the validating of the first resource access token.

* * * * *